J. S. McCOY.
GREASE CUP.
APPLICATION FILED MAY 10, 1916.

1,226,786.

Patented May 22, 1917.

Witnesses
Chas. E. Smith

Inventor
J. S. McCoy.
By E. E. Vrooman & Co.,
his Attorneys

UNITED STATES PATENT OFFICE.

JOHN S. McCOY, OF SCARBRO, WEST VIRGINIA.

GREASE-CUP.

1,226,786.  Specification of Letters Patent.  Patented May 22, 1917.

Application filed May 10, 1916. Serial No. 96,625.

*To all whom it may concern:*

Be it known that I, JOHN S. McCOY, a citizen of the United States of America, residing at Scarbro, in the county of Fayette and State of West Virginia, have invented certain new and useful Improvements in Grease-Cups, of which the following is a specification, reference being had therein to the accompanying drawing.

This invention relates to a means for lubricating the axle or spindle of a vehicle such as a wagon and the like, and has for its object the production of a simple and efficient means for feeding lubricant to the outer periphery of the axle.

Another object of this invention is the production of a simple and efficient lubricating means which will permit the cleaning thereof should it be found necessary at the time the lubricating means is being refilled.

With these and other objects in view this invention consists of certain novel combinations, constructions and arrangements of parts as will be hereinafter fully described and claimed.

In the accompanying drawing:—

Figure 1:
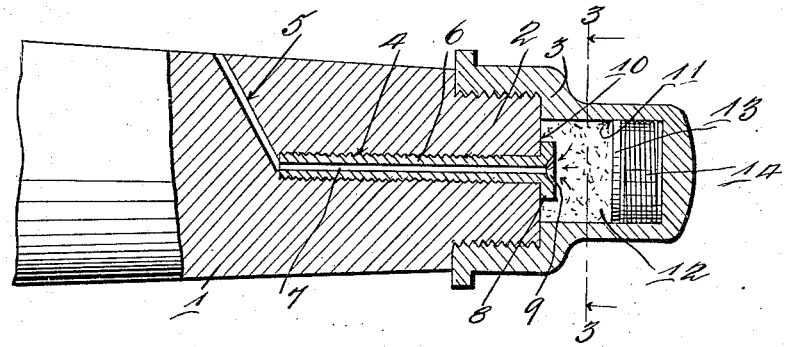
Figure 1 is a longitudinal section through the spindle of an axle.
Figure 2:
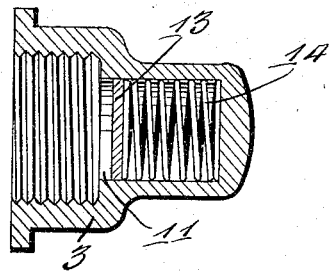
Fig. 2 is a longitudinal section through the wheel retaining nut.
Figure 3:
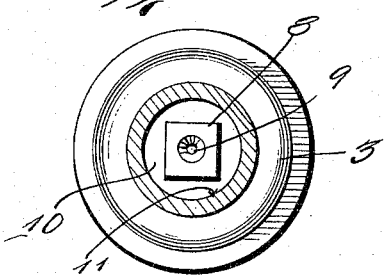
Fig. 3 is a section taken on line 3—3, of Fig. 1.
Figure 4:
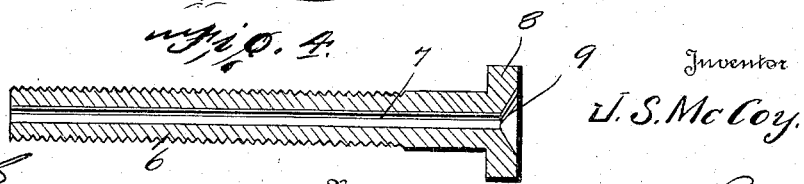
Fig. 4 is a longitudinal section of the lubricant feeding screw detached from the axle spindle.

By referring to the drawing it will be seen that 1 designates the axle spindle which is provided with the usual leg screw 2 upon which the nut 3 is threaded. The spindle 1 is provided with a longitudinally extending threaded aperture 4 and an upwardly inclined aperture 5, the aperture 4 being of greater size than the aperture 5. A threaded lubricant feeding screw 6 is threaded in the aperture 4 and is provided with a longitudinally extending aperture or channel 7 of the same diameter as the aperture or channel 5. This screw 6 is provided with an enlarged head 8 having a pocket 9 formed in the outer end thereof communicating with the aperture 7. This enlarged head 8 is adapted to overhang the outer edge 10 of the spindle 1 as illustrated in Fig. 1 and limits the inward movement of the screw 6 within the aperture 4. The nut 3 is provided with an enlarged pocket 11, which pocket is adapted to receive the lubricant 12, and a sliding plunger cap 13 is slidably mounted within the aperture 11 and is engaged by means of a spring 14, the spring 14 being adapted to force the plunger cap 13 inwardly and thereby feed the lubricant 12 through the pocket 9 and aperture 7 and up through the aperture 5 to the inner face of the hub of the wheel which is adapted to be mounted upon the spindle 1. It should be understood that as the plunger cap 13 moves inwardly, the lubricant will be forced or fed through the spindle 1 as above described, and after all of the lubricant has been forced out of the pocket 11, and the plunger 13 engages the outer face of the head 8, this plunger 13 will be prevented from sticking upon the face 10 of the end of the spindle 1. It should be understood that if this head 8 were not provided, the plunger 13 would have a tendency to stick to the under face 10 of the spindle 1, thereby preventing the easy removal of the plunger head 13 when the nut 3 is removed from the spindle 1.

From the foregoing description it will be seen that a very simple and efficient structure has been produced for feeding lubricant to the outer periphery of an axle spindle, and that a very few and simply constructed parts are employed in order to accomplish the desired result.

Having thus described the invention what is claimed as new, is:—

As a new article of manufacture, an axle spindle provided with a longitudinally extending aperture, said spindle provided with an upwardly inclined aperture communicating with said longitudinally extending aperture and the outer face of said spindle, a lubricant feeding screw threaded within said longitudinally extending aperture and provided with an elongated longitudinally extending channel communicating with said upwardly inclined aperture, a nut threaded upon the outer end of said spindle, said nut provided with a lubricant receiving pocket, a plunger positioned within said pocket of the same diameter as the inner face of said pocket, a spring for urging said plunger toward said lubricant feeding screw for automatically feeding lubricant through said lubricant feeding screw, and said lubricant feeding screw provided with an enlarged head for limiting the inward movement of said plunger with respect to said spindle.

In testimony whereof I hereunto affix my signature.

JOHN S. McCOY.

Copies of this patent may be obtained for five cents each, by addressing the "Commissioner of Patents, Washington, D. C."